(12) United States Patent
Huang et al.

(10) Patent No.: US 11,731,343 B2
(45) Date of Patent: Aug. 22, 2023

(54) THREE-DIMENSIONAL PRINTING OF REACTIVE MATERIALS USING INTERSECTING JETS

(71) Applicant: University of Florida Research Foundation, Inc., Gainesville, FL (US)

(72) Inventors: Yong Huang, Gainesville, FL (US); Kyle Will Christensen, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 1006 days.

(21) Appl. No.: 16/007,081

(22) Filed: Jun. 13, 2018

(65) Prior Publication Data

US 2018/0370116 A1 Dec. 27, 2018

Related U.S. Application Data

(60) Provisional application No. 62/525,426, filed on Jun. 27, 2017.

(51) Int. Cl.
*B29C 64/112* (2017.01)
*B29C 64/393* (2017.01)
(Continued)

(52) U.S. Cl.
CPC .......... *B29C 64/112* (2017.08); *B29C 64/209* (2017.08); *B29C 64/393* (2017.08);
(Continued)

(58) Field of Classification Search
None
See application file for complete search history.

(56) References Cited

U.S. PATENT DOCUMENTS 6,331,438 B1 * 12/2001 Aylott .................... G01N 21/66
422/82.07
2003/0175410 A1 * 9/2003 Campbell ............... A61L 27/38
427/2.24

(Continued)

OTHER PUBLICATIONS

Murphy SV and Atala A, 3D bioprinting of tissues and organs, Nature Biotechnology 32(8), 2014, 773-85.
(Continued)

*Primary Examiner* — Alejandro Valencia
(74) *Attorney, Agent, or Firm* — Alston & Bird LLP

(57) ABSTRACT

Various examples of systems and methods are provided for three-dimensional (3D) printing of reactive materials. In one aspect, among others, a system includes a droplet generation assembly comprising a first printhead coupled to a first reservoir of reactive material and a second printhead coupled to a second reservoir of reactive material, the first and second printheads configured to produce jets of reactive material droplets; a jet alignment assembly configured to adjust orientation of the first and second printheads to align the jets of the reactive material droplets for intersection at a collision point; and a motion control assembly configured to adjust positioning of the first and second printheads and a platform configured to position a deposition location at the collision point.

16 Claims, 8 Drawing Sheets

(51) Int. Cl.
  B29C 64/209     (2017.01)
  B33Y 70/00      (2020.01)
  B41J 2/045      (2006.01)
  B41J 2/21       (2006.01)
  B29C 64/245     (2017.01)
  B33Y 30/00      (2015.01)
  B33Y 50/02      (2015.01)
  B33Y 80/00      (2015.01)
  B33Y 10/00      (2015.01)

(52) U.S. Cl.
  CPC ........... B33Y 70/00 (2014.12); B41J 2/04505 (2013.01); B41J 2/2135 (2013.01); *B29C 64/245* (2017.08); *B33Y 10/00* (2014.12); *B33Y 30/00* (2014.12); *B33Y 50/02* (2014.12); *B33Y 80/00* (2014.12)

(56) References Cited

U.S. PATENT DOCUMENTS

| | | | | |
|---|---|---|---|---|
| 2015/0328839 | A1* | 11/2015 | Willis | G05B 19/4099 700/98 |
| 2017/0172765 | A1* | 6/2017 | Solorzano | C12M 33/00 |
| 2019/0176362 | A1* | 6/2019 | Malarkey | B30B 11/24 |

OTHER PUBLICATIONS

Boland T, Tao X, Damon BJ, Manley B, Kesari P, Jalota S and Bhaduri S, Drop on demand printing of cells and materials for designer tissue constructs, Mat Sci Eng C 27, 2007, 372-376.

Nishiyama Y, Nakamura M, Henmi C, Yamaguchi K, Mochizuki S, Nakagawa H and Takiura K, Development of a three-dimensional bioprinter construction of cell supporting structures using hydrogel and state-of-the-art inkjet technology J. Biomech. Eng. 131, 2009, 035001-1: 035001-6.

Xu C, Chai W, Huang Y and Markwald RR, Scaffold-free inkjet printing of three dimensional zigzag cellular tubes, Biotechnology and Bioengineering 109(12), 3152-60.

Faulkner-Jones A, Fyfe C, Cornelissen DJ, Gardner J, King J, Courtney A and Shu W, Bioprinting of human pluripotent stem cells and their directed differentiation into hepatocyte-like cells for the generation of mini-livers in 3D, 2015 Biofabrication 7(4) 044102, pp. 1-13.

Li C, Faulkner-Jones A, Dun AR, Jin J, Chen P, Xing Y, Yang Z, Li Z, Shu W, Liu D and Duncan RR, Rapid formation of a supramolecular polypeptide-DNA hydrogel for in situ three-dimensional multilayer bioprinting, Angewandte Chemie International Edition 54(13), 2015, 3957-3961.

Faulkner-Jones A, Greenhough S, King JA, Gardner J, Courtney A and Shu W, Development of a valve-based cell printer for the formation of human embryonic stem cell spheroid aggregates, Biofabrication 5(1), 2013, 015013, pp. 1-12.

Yeo Y, Chen AU, Basaran OA and Park K, Solvent exchange method a novel microencapsulation technique using dual microdispensers, Pharmaceutical Research 21(8), 2004, 1419-27.

Yeo Y and Park K, A new microencapsulation method using an ultrasonic atomizer based on interfacial solvent exchange, Journal of Controlled Release 100(3), 2004, 379-88.

Park JH, Ye M, Yeo Y, Lee WK, Paul C and Park K, 2006, Reservoir-type microcapsules prepared by the solvent exchange method effect of formulation parameters on microencapsulation of lysozyme, Molecular Pharmaceutics 3(2) 135-43.

Mou F, Chen C, Guan J, Chen DR and Jing H, 2013, Oppositely charged twin-head electrospray a general strategy for building Janus particles with controlled structures Nanoscale, 5(5) 2055-2064.

Wan F, Maltesen MJ, Andersen SK, Bjerregaard S, Foged C, Rantanen J and Yang M, 2014, One-step production of protein-loaded PLGA microparticles via spray drying using 3-fluid nozzle, Pharmaceutical Research 31(8) 1967-77.

Fathi S and Dickens P, 2013, Challenges in drop-on-drop deposition of reactive molten nylon materials for additive manufacturing, Journal of Materials Processing Technology, 213(1) 84-93.

Herran CL, Huang Y and Chai W, 2012, Performance evaluation of bipolar and tripolar excitations during nozzle-ietting-based alginate microsphere fabrication, J. Micromech. Microeng. 22(8) 085025: 1-11.

Thornhoff JR, Lou DI, Jordan PM, Zhao X and Wu P, 2007, Compatibility of human fetal neural stem cells with hydrogel biomaterials in vitro, Brain Research 1187, 42-51.

Allen P, Melero-Martin J and Bischoff J, 2011, Type I collagen, fibrin and PuraMatrix matrices provide permissive environments for human endothelial and mesenchymal progenitor cells to form neovascular networks, Journal of Tissue Engineering and Regenerative Medicine 5 74-86.

Li X, Katsanevakis E, Liu X, Zhang N and Wen X, 2012, Engineering neural stem cell fates with hydrogel design for central nervous system regeneration, Progress in Polymer Science 37 1105-1129.

Augst AD, Kong HJ and Mooney DJ, 2006, Alginate hydrogels as biomaterials, Macromol Biosci 6 623-633.

Murphy SV, Skardal A and Atala A, 2013, Evaluation of hydrogels for bio-printing applications, J Biomed Mater Res Part A 101 272-284.

Fan L, Cao M, Gao S, Wang T, Wu H, Peng M, Zhou X and Nie M, 2013, Preparation and characterization of sodium alginate modified with collagen peptides, Carbohydrate Polymers 93(2) 380-385.

Sun J and Tan H, 2013, Alginate-based biomaterials for regenerative medicine applications, Materials 6(4) 1285-309.

Aligholi H, Rezayat SM, Azari H, Mehr SE, Akbari M, Mousavi S MM, Attari F, Alipour F, Hassanzadeh G and Gorji A, 2016, Preparing neural stem/progenitor cells in PuraMatrix hydrogel for transplantation after brain injury in rats a comparative methodological study, Brain Research, 1642 197-208.

Curley JL, Sklare SC, Bowser DA, Saksena J, Moore MJ and Chrisey DB, 2016, Isolated node engineering of neuronal systems using laser direct write, Biofabrication 8(1) 015013: pp. 1-9.

Negah SS, KhaksarZ, Aligholi H, Sadeghi SM, Mousavi SMM, Kazemi H, Jahan-Abad AJ and Gorji A, 2016, Enhancement of neural stem cell survival, proliferation, migration, and differentiation in a novel self-assembly peptide nanofibber scaffold, Molecular Neurobiology 1-13.

Ni N, Hu Y, Ren H, Luo C, Li P, Wan J B, Su H, 2013, Self-assembling peptide nanofiber scaffolds enhance dopaminergic differentiation of mouse pluripotent stem cells in 3-dimensional culture, PloS One 8(12) e84504: pp. 1-11.

Francis NL, Bennett NK, Halikere A, Pang ZP and Moghe PV, 2016, Self-assembling peptide nanofiber scaffolds for 3-D reprogramming and transplantation of human pluripotent stem cell-derived neurons, ACS Biomaterials Science & Engineering 2(6), 1030-1038.

Boskey AL, 2013, Bone composition: relationship to bone fragility and antiosteoporotic drug effects, BoneKEy reports 2, 447, pp. 1-11.

\* cited by examiner

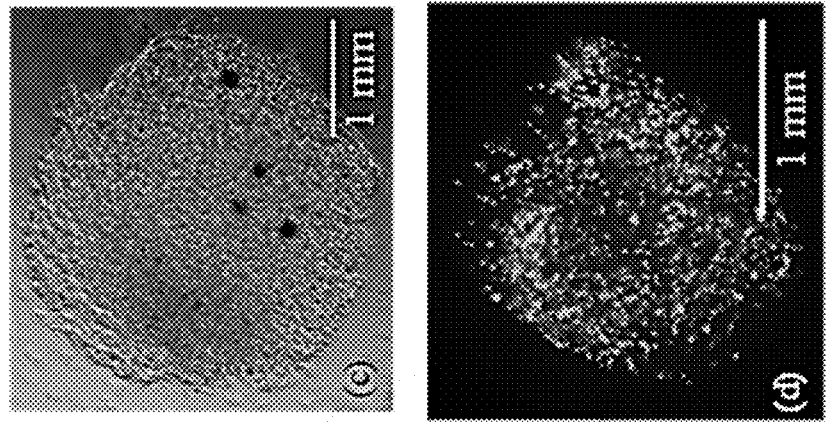
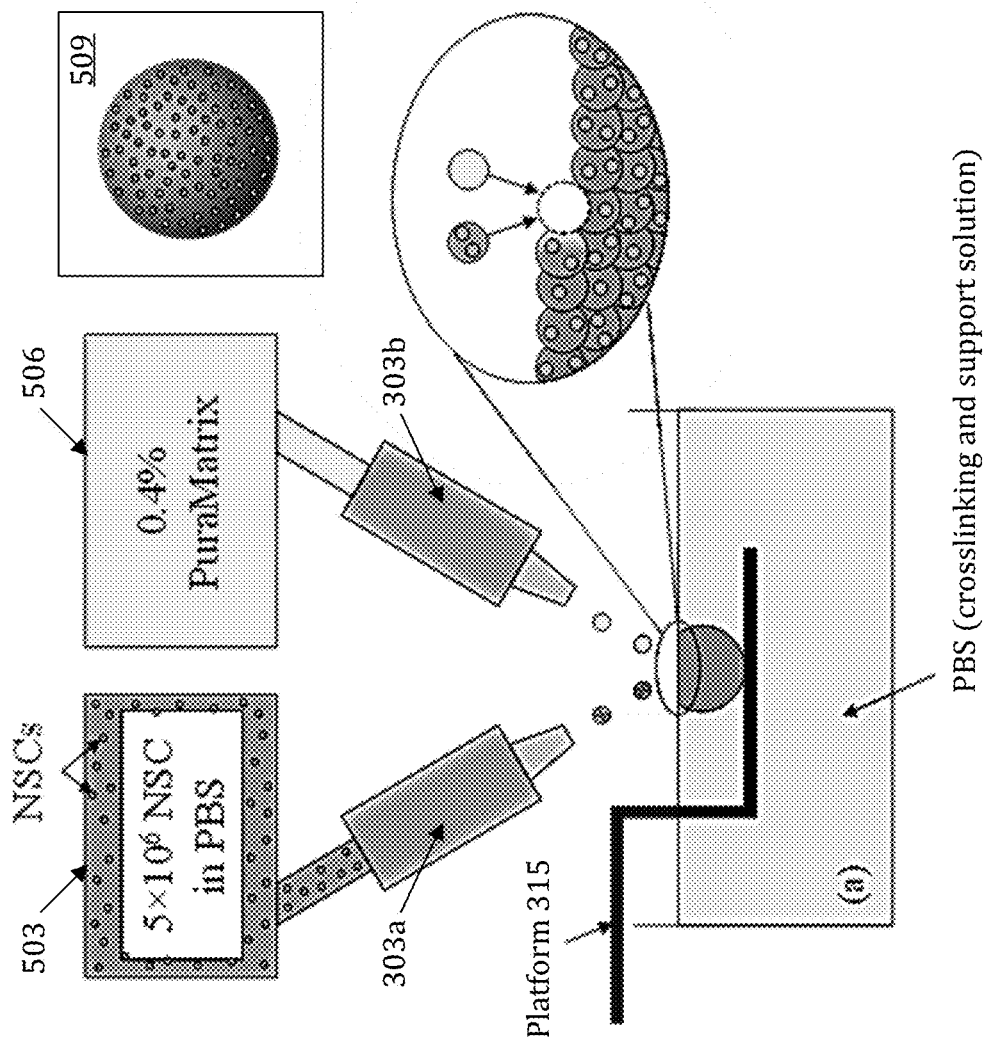
FIG. 5B
FIG. 5C
FIG. 5A

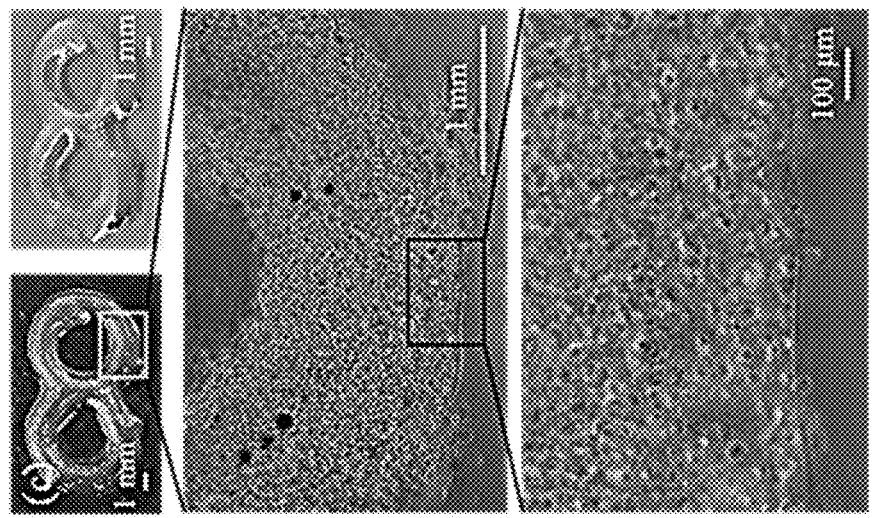
FIG. 7B
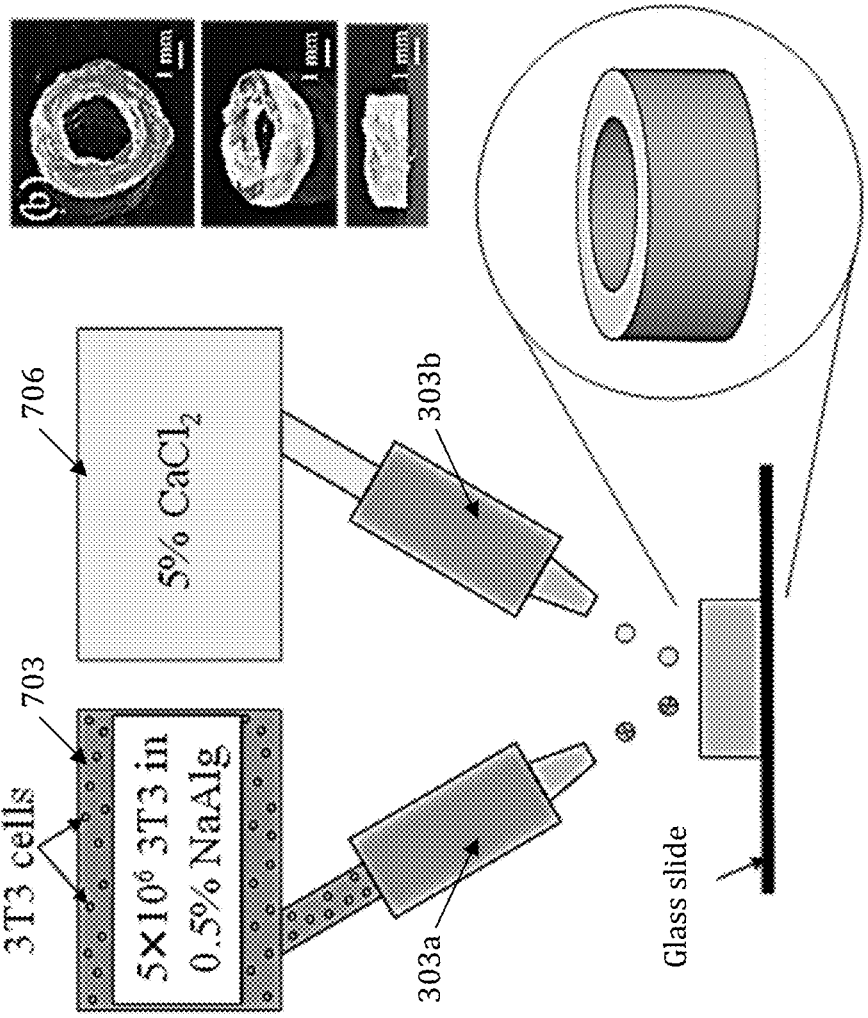
FIG. 7C
FIG. 7A

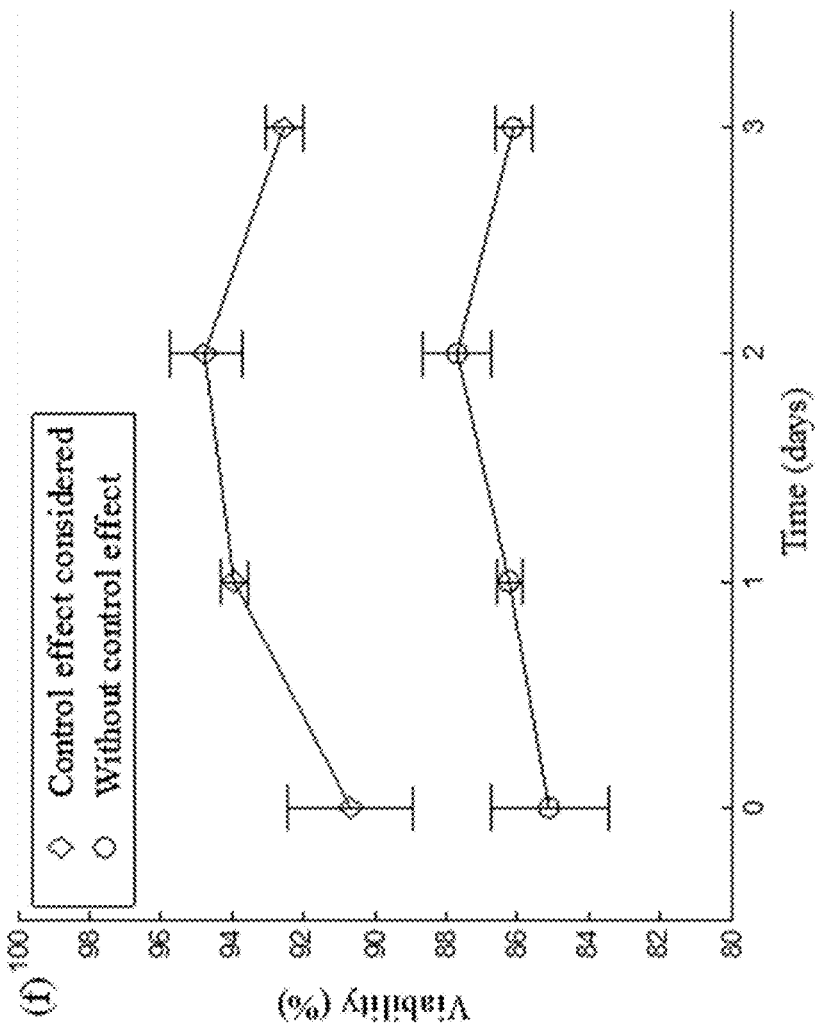
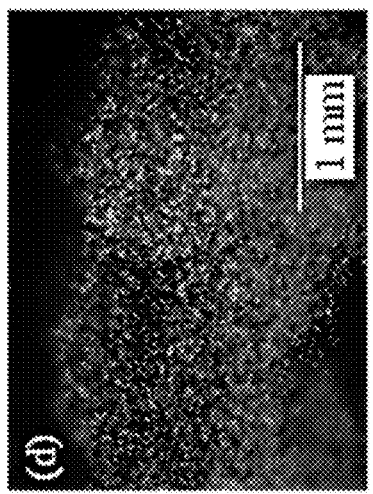
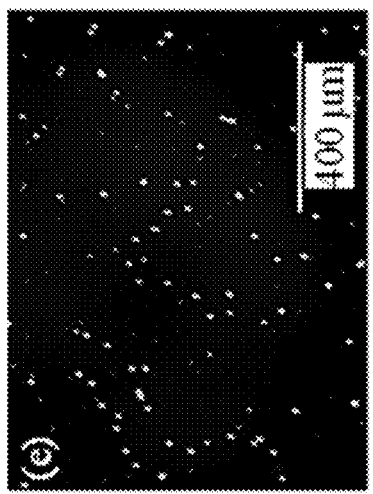
FIG. 7D
FIG. 7E
FIG. 7F

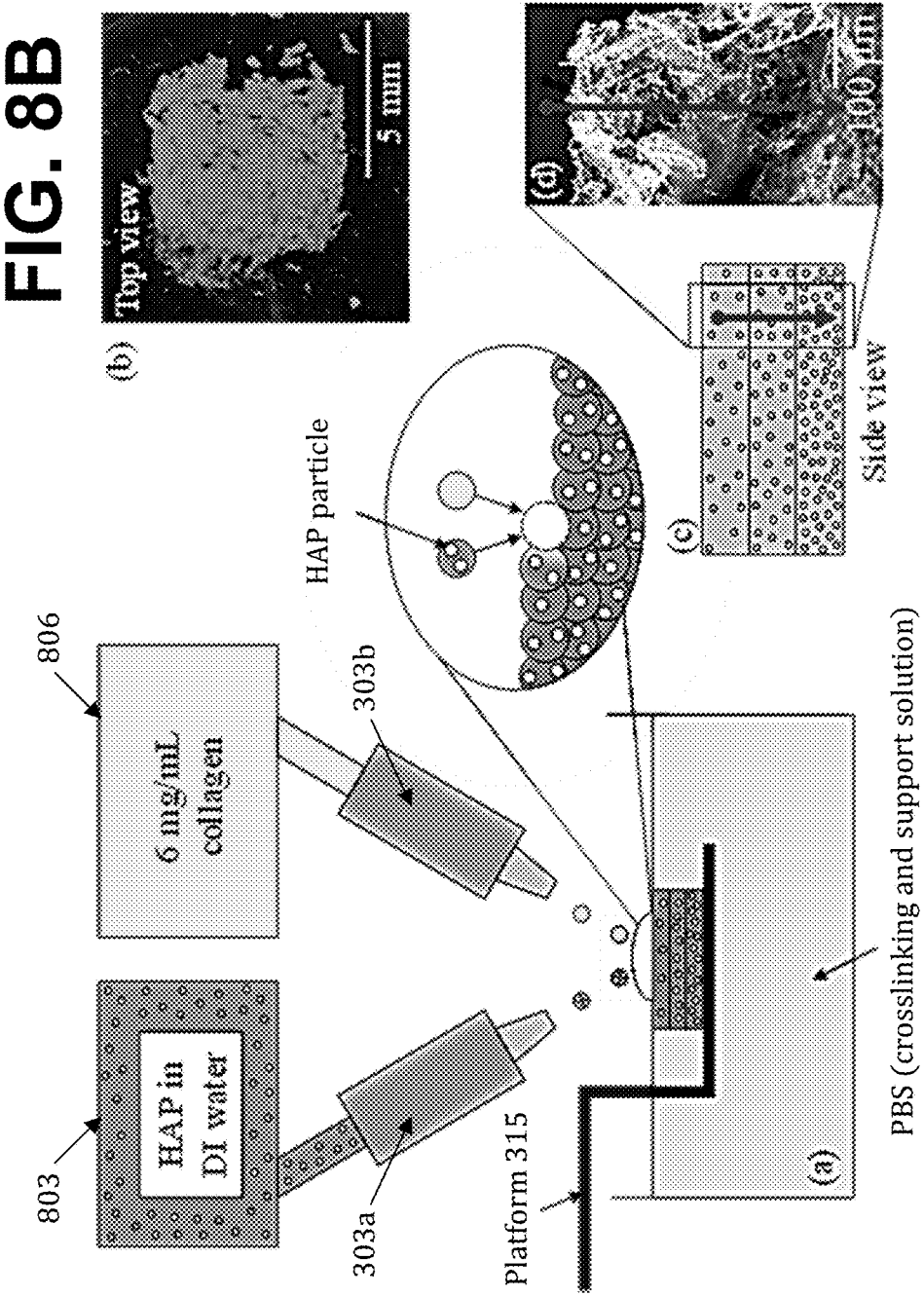
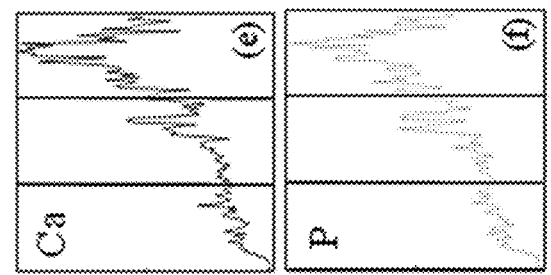
FIG. 8A
FIG. 8B
FIG. 8C
FIG. 8D
FIG. 8E

THREE-DIMENSIONAL PRINTING OF REACTIVE MATERIALS USING INTERSECTING JETS

CROSS REFERENCE TO RELATED APPLICATIONS

This application claims priority to, and the benefit of, U.S. provisional application entitled "Three-Dimensional Printing of Reactive Materials Using Intersecting Jets" having Ser. No. 62/525,426, filed Jun. 27, 2017, the entirety of which is hereby incorporated by reference.

STATEMENT REGARDING FEDERALLY SPONSORED RESEARCH OR DEVELOPMENT

This invention was made with government support under grant number 1634755 awarded by the National Science Foundation (NSF). The Government has certain rights in the invention.

BACKGROUND

Additive manufacturing, or three-dimensional (3D) printing, enables the layer-by layer fabrication of functional structures. For some 3D printing applications, inks must be mixed before printing. This prevents the use of reactive materials which undergo changes in rheological properties, such as gelation or a substantial increase in viscosity, that cause the material to become unable to form droplets or filaments as building blocks. When fabricating cellular structures, some reactive materials which are not cytocompatible may also not be used with cells directly as bioinks for printing. Furthermore, recreating cellular and material heterogeneity as observed in native tissue is important for the fabrication of functional biological structures. On a large scale, such heterogeneity results in the diverse tissues and organs that make up the human body. At the microscopic level, the spatial organization of multiple cell types is essential for each tissue to function properly. While this complexity in native tissues arises as a result of developmental processes, recreating it in engineered constructs is a fabrication challenge which requires advanced manufacturing techniques.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4B through 4D are images showing examples of the intersecting jets of reactive material droplets and deposition of intersected droplets, in accordance with various embodiments of the present disclosure.

FIG. 5A is a schematic diagram illustrating the fabrication of PuraMatrix-based neural stem cell (NSC) spheres using the intersecting jets printing system of FIG. 3, in accordance with various embodiments of the present disclosure.

FIGS. 5B and 5C include images showing an example of a fabricated NSC sphere, in accordance with various embodiments of the present disclosure.

FIG. 7A is a schematic diagram illustrating the fabrication of alginate structures using the intersecting jets printing system of FIG. 3, in accordance with various embodiments of the present disclosure.

FIGS. 7B through 7E include images showing an example of fabricated cellular alginate annular structures, in accordance with various embodiments of the present disclosure.

FIG. 7F is a plot illustrating cell viability in a cellular alginate annular structure over 3 days of incubation, in accordance with various embodiments of the present disclosure.

FIG. 8A is a schematic diagram illustrating the fabrication of collagen sheets with a spatial variation in hydroxyapatite (HAP) content using the intersecting jets printing system of FIG. 3, in accordance with various embodiments of the present disclosure.

FIGS. 8B and 8C include top and side views of a printed collagen sheet with gradient HAP features, in accordance with various embodiments of the present disclosure.

FIGS. 8D and 8E are plots illustrating calcium and phosphorous content corresponding to the gradient HAP features in the printed collagen sheet, in accordance with various embodiments of the present disclosure.

DETAILED DESCRIPTION

Figure 1:
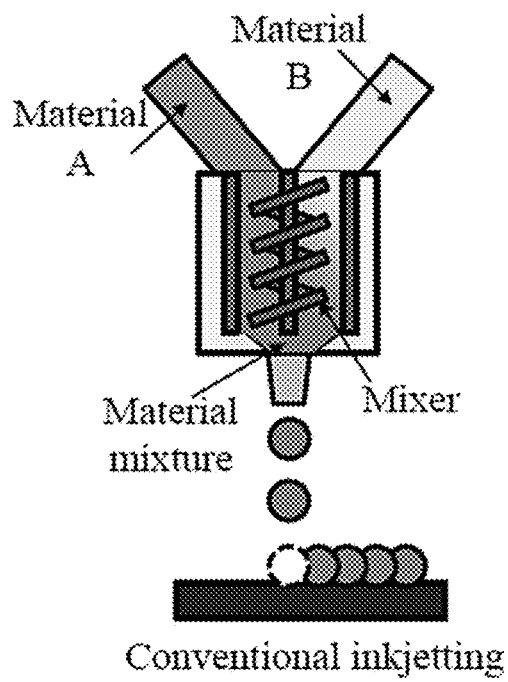
FIG. 1 is a schematic diagram illustrating an example of pre-print mixing (mixing-then-printing) for printing of miscible materials, in accordance with various embodiments of the present disclosure.

Disclosed herein are various embodiments related to three-dimensional (3D) printing of reactive materials. The 3D printing can be accomplished using intersecting jets, which can mix the reactive materials. Biological structures can be fabricated using this technology. The present disclosure addresses the challenges of functional biological structure fabrication by utilizing intersecting jets to enable voxel-resolution mixing of reactive materials after printing in addition to the fabrication of well-defined heterogeneous structures. Reference will now be made in detail to the description of the embodiments as illustrated in the drawings, wherein like reference numbers indicate like parts throughout the several views.

One of the techniques that can be used for fabrication of functional biological structures is additive manufacturing for healthcare applications, or three dimensional (3D) bioprinting. Bioprinting aims to fabricate bioactive or living cellular structures for tissue engineering and regenerative medicine needs. These biological structures with user-defined geometry, materials, and cellular composition offer great promise as tissue engineering platforms for the study of disease progression and drug efficacy, to name a few. Furthermore, the on-demand fabrication of implantable tissues and organs offers a viable solution to address the growing shortage of organ donors and transplantable human organs.

Generally, bioprinting approaches can be classified as droplet-based including inkjet and laser-induced forward transfer (LIFT) printing, and filament-based including micro-extrusion and filament assembly. While each printing method offers unique capabilities and advantages, droplet-based techniques can more easily fabricate complex and heterogeneous parts with a resolution defined by the size of each droplet. As such, droplet-based techniques have been favored in many pixel-by-pixel fabrication applications.

While numerous materials are compatible with 3D printing, suitable biomaterials for bioprinting, which fulfill both printability and biocompatibility needs, are still very limited. For some droplet-based 3D printing applications such as inkjet printing, inks can be prepared by mixing different ingredient materials before printing as a "mixing-then-printing" approach. Typical bioprinting protocol during traditional mixing-then-printing approaches require all components of the bioink formulation, including soluble and suspended materials, to be mixed before deposition. Upon deposition, chemical and/or physical gelation/solidification mechanisms are needed to conserve the shape being printed. FIG. 1 is a schematic diagram illustrating an example of pre-print mixing (mixing-then-printing) for miscible materials. Material A and material B are combined in a mixer before the material mixture is projected onto a substrate.

Unfortunately, ingredient materials for the making of inks are sometimes reactive to each other, so they may react or crosslink if mixed, resulting in difficult-to-print or even unprintable inks. To be printable, mixed bioinks need to remain dispensable with suitable process-dependent rheological properties to facilitate the formation of droplets or filaments as building blocks. Cell-laden bioinks also need to remain cytocompatible throughout the printing process. These considerations preclude the use of reactive bioink components for bioprinting which undergo gelation or a significant change in rheological properties such as, e.g., a substantial increase in viscosity where they become unprintable under physiological conditions. Such reactive materials cannot be mixed prior to printing due to the loss of printability, so it is desirable that they instead interact as they either collide in air or mix on a substrate.

Figure 2:
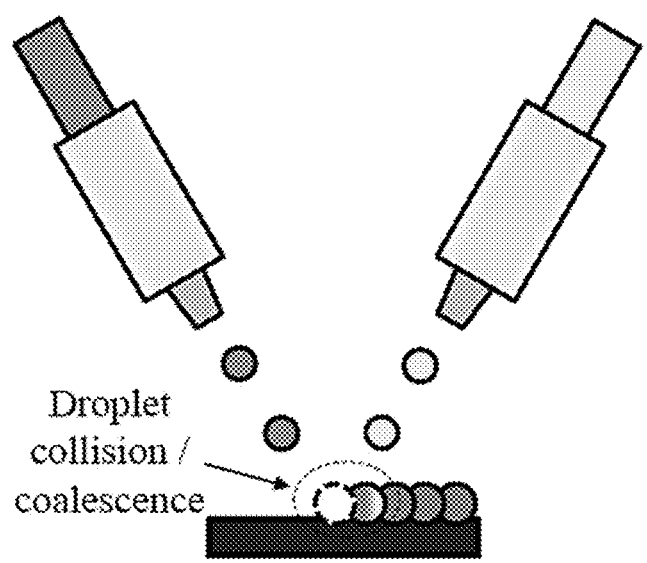
FIG. 2 is a schematic diagram illustrating an example of post-print mixing (printing-then-mixing) for printing of reactive materials, in accordance with various embodiments of the present disclosure.

The implementation of an intersecting jets-based "printing-then-mixing" inkjet bioprinting approach can enable voxel-resolution mixing and printing for the fabrication of biological structures using reactive materials. To overcome the printability issue during traditional mixing-then-printing of reactive materials, a droplet-based inkjet fabrication technique can be altered to eject independent droplets of each reactive component. These droplets collide, mix, coalesce, and gel upon deposition on a receiving substrate in a printing-then-mixing process. FIG. 2 is a schematic diagram illustrating an example of post-print mixing (printing-then-mixing) for reactive materials. The reactive materials are independently projected as separate droplets that collide and coalesce on a substrate.

Inkjet printing has often been favored for bioprinting for its low cost, scalability, and high resolution. Inkjetting is implemented herein as a versatile, scalable technique to generate droplets from reactive materials for mixing and deposition; the mixed droplet provides voxel-level printing resolution based on the size of coalesced droplets. Because the composition of each voxel is controlled by selecting the ratio of the reactive components deposited in that location, this process enables well-defined structural heterogeneity as well. In particular, the disclosed intersecting jets printing approach has been applied to print neural stem cell (NSC) spheres, cellular alginate structures, and gradient hydroxyapatite (HAP) features.

Individual droplets can be mixed or coalesced for various advanced fabrication applications. For instance, individual droplets can be mixed to fabricate microcapsules, and such droplets can be prepared using inclined microdispensers, an ultrasonic atomizer, a twin-head electrospraying system with opposite charges, or spray dried coaxial fluid flows. Similarly, droplets of reactive materials can also be mixed and used as building blocks for 3D printing in a printing-then-mixing approach, which can be implemented in two ways: alternating printing or simultaneous printing. During alternating printing, droplets are deposited at the same location/layer sequentially, which may limit mixing between materials. During simultaneous printing, droplets are deposited at the same location/layer at the same time or with a short time interval, usually accompanied by collision and resulting in improved mixing.

Alternating printing has been reported for the successful fabrication of various structures from disparate materials, including reactive materials. Droplets of nylon 6 have been synthesized by the consecutive deposition of reactive solutions at the same location. 3D cellular hydrogel structures have been fabricated by the deposition of sodium alginate followed by the deposition of a calcium crosslinking solution. Similarly, the alternating deposition of polypeptide-DNA conjugate and complementary DNA linker solutions has enabled the fabrication of 3D hydrogel structures. Alternating printing can also enable the fabrication of structures with compositional gradients. Droplet arrays with gradients in cell concentrations can be fabricated by sequential deposition of a cell suspension and cell medium by varying the relative volumes deposited.

While alternating printing provides a promising approach for the printing of reactive materials, the resulting mixing performance is limited and may be inadequate for some applications. Although sequential deposition of reactive materials on a substrate enables the fabrication of defined 3D structures, the two deposition locations must be precisely known and controlled such that droplets impact precisely onto one another after a controlled movement between printheads. This alignment may be difficult to achieve or maintain, and is subject to error and fluctuations in jet trajectory. While the approach is certainly scalable, the frequent need to switch printheads between deposition locations decreases the fabrication speed. Sequential deposition may also not be suitable for printing which uses a solution bath to crosslink and support structures during printing. Due to the time between alternating ink depositions, one initially printed ink may be diluted or diffuse into the surrounding bath before its reactive counterpart is printed. Furthermore, a possible reaction between the bath and the initially printed ink may occur during this time and prevent mixing or interaction with the subsequently printed material.

In this disclosure, simultaneous printing, which involves active collision, mixing, and coalescence, and offers improved efficiency and control for reactive material printing, is developed and implemented for the printing of reactive materials. By using multiple inkjet printheads to generate intersecting jets from reactive materials and simultaneously deposit resulting droplets at the same location, where printed droplets mix and coalesce with one another, 3D structures can be fabricated in a printing-then-mixing configuration with a droplet size-based voxel resolution. In particular, this enables reactive ink solutions to be inkjet printed separately and then react and gel/solidify at a single deposition location. For example, a hydrogel precursor which is only printable under cytotoxic conditions may be printed from one printhead while a physiological cell suspension is printed from an intersecting printhead, such that a cell-laden hydrogel is formed at the deposition location. As with alternating printing, intersecting jets-based simultaneous printing also enables the fabrication of structures with compositional gradients since the material composition at any point within a printed structure can easily be controlled online based on the relative deposition rate of different materials. For example, controlling the relative deposition rates between a hydrogel precursor and a particle laden solution offers spatial control of the particle concentration throughout a structure.

Intersecting Jets Printing Platform

Figure 3:
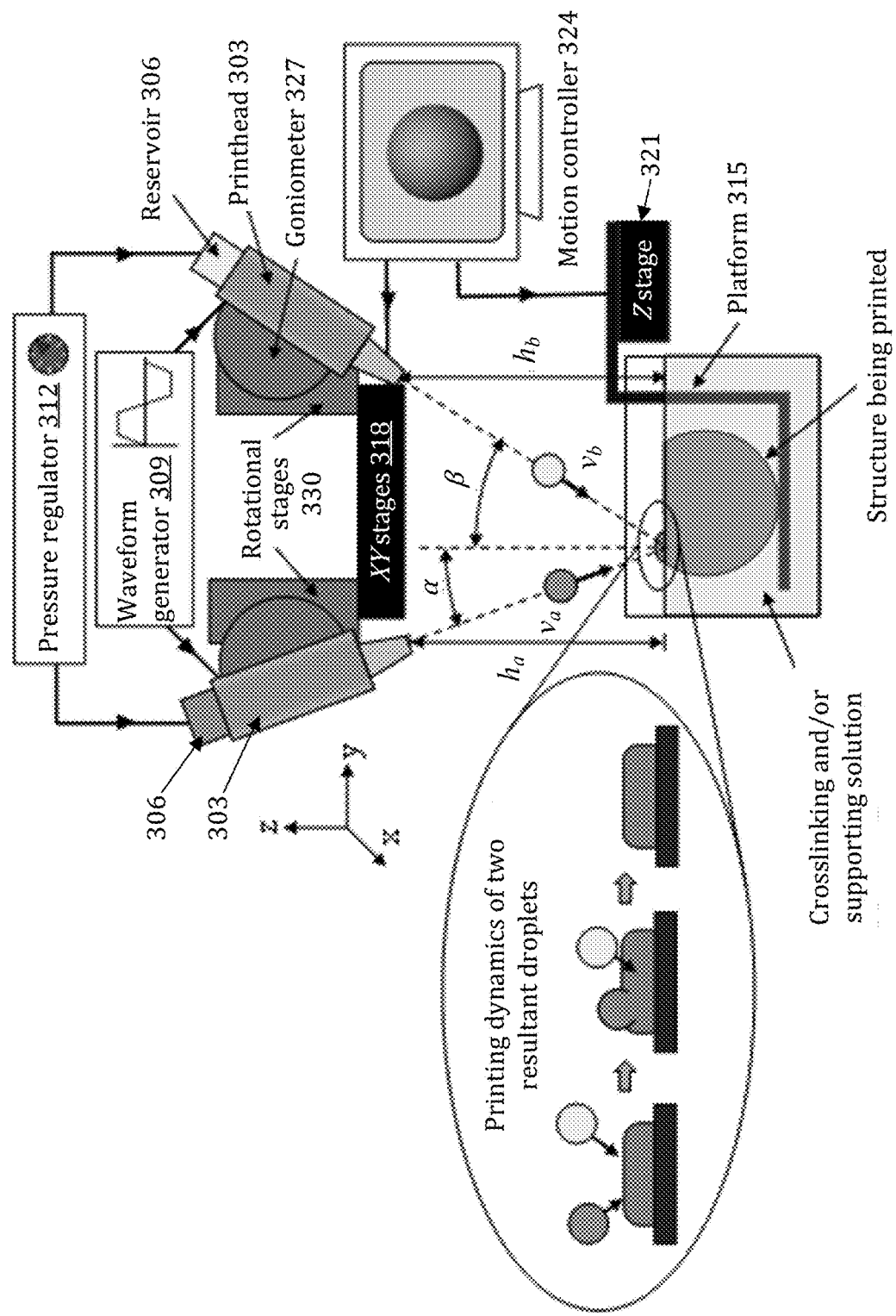
FIG. 3 is a schematic diagram illustrating an example of a system implementing the intersecting jets approach for bioprinting of reactive materials, in accordance with various embodiments of the present disclosure.

Referring to FIG. 3, shown is a schematic diagram illustrating an example of a system implementing the intersecting jets approach utilizing two intersecting printheads. The intersecting jets approach was developed and implemented based on a platform-assisted 3D inkjet printing setup. As illustrated in FIG. 3, the intersecting jets printing system had three primary modules: a droplet generation module, a motion control module, and a jet alignment module. The droplet generation module is responsible for the formation of droplets of reactive material fluids. The droplets can be ejected in a drop-on-demand mode using, e.g., 120 µm diameter piezoelectric printheads 303 (e.g., MJ-ABL piezoelectric printheads, MicroFab, Plano, Tex.), which can receive the reactive material from a reservoir 306 for that printhead 303. The printheads 303 can be driven by a waveform generator 309, with driving voltages between ±60 and ±120 V, rise and fall times of 6 µs, dwell/echo times of 20-45 µs, and frequencies of 30-120 Hz. Fluid back pressures can be maintained using a multichannel pneumatics controller or regulator 312 (e.g., MicroFab, Plano, Tex.) to ensure proper menisci within the nozzles for droplet formation. While two printheads 303 are illustrated, additional printheads 303 and their associated reservoirs 306 can be included in the apparatus.

The motion control module can coordinate the motion of the printheads 303 and receiving platform 315. During printing, the printheads 303 can be fixed relative to one another and moved together in the xy-plane relative to the platform 315. The platform 315, where the printed structure is built, can provide the z-direction motion to match the layer thickness. The deposition location of the droplets can be controlled by computerized movement of the printheads 303 such that adjacent droplets form layers of designed shapes. For support bath-enabled printing such as that illustrated in FIG. 3, layers can be solidified as the structure is submerged into a crosslinking and supporting solution. For printing in air, structures can be printed directly onto a receiving glass slide or other appropriate substrate. Based on a computer aided design (CAD), layers can be printed on top of one another consecutively to form a 3D structure. In particular, the printhead motion can be controlled by motorized XY stages 318 (e.g., Aerotech, Pittsburgh, Pa.) and the receiving platform can be raised or lowered by a Z stage 321 (e.g., Aerotech, Pittsburgh, Pa.). The motion of the XYZ stages 318/321 can be controlled by a motion controller 324 using, e.g., AeroBasic and/or G code commands based on the designed geometry. In general, printhead travel speeds can range from 1 to 8 mm/s, and layer thickness can be controlled at 25 µm, 50 µm or other appropriate thickness.

The jet alignment module can control the alignment and collision of the generated droplets. As shown in FIG. 3, the jets from two inclined printheads 303, which may have different standoff distances ($h_a$ and $h_b$) and different inclination angles ($\alpha$ and $\beta$) were aligned such that droplets intersected at a deposition location at speeds of $v_a$ and $v_b$. For example, for one study the standoff distances ($h_a$ and $h_b$) were fixed at 5.0 mm for both printheads 303 and the inclination angles ($\alpha$ and $\beta$) were fixed at 30 degrees for both printheads 303. Additional printheads 303 can be included. For the alignment of multiple inkjet printheads 303, a customized goniometer-based apparatus was designed and fabricated. In some implementations, additional printheads 303 can be used to print different combinations of reactive inks. With appropriate alignment and motion control, structures including a combination of different materials can be produced.

Figure 4A:
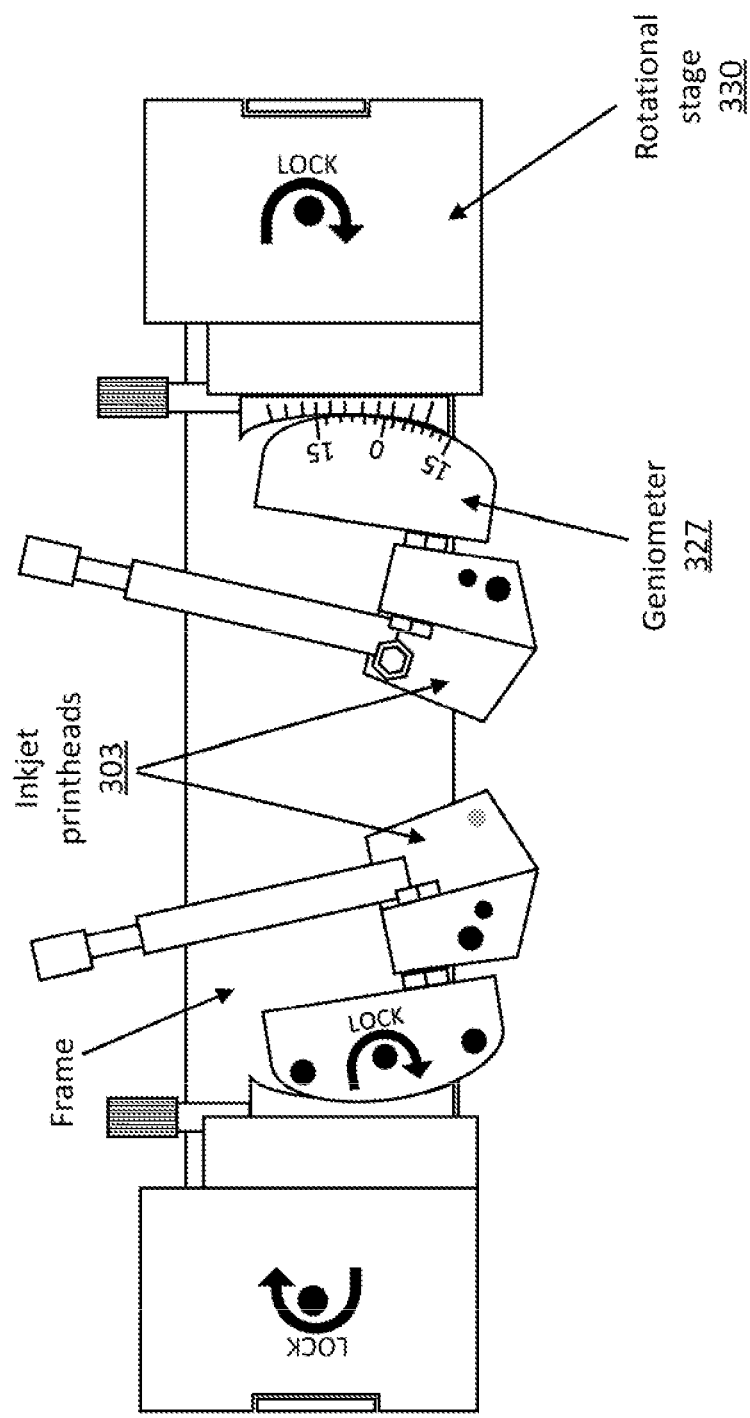
FIG. 4A is an image of an example of a jet alignment module of the intersecting jets printing system of FIG. 3, in accordance with various embodiments of the present disclosure.

FIG. 4A is an image of an example of the jet alignment module that was implemented for the intersecting jets printing system. As shown in FIG. 4A, the alignment apparatus can have a frame with linear slots for adjustment of the distances between the printheads 303. The printheads 303 can be mounted to goniometers 327 (e.g., Thorlabs, Newton, N.J.), which can be further mounted to rotational stages 330 (e.g., Thorlabs, Newton, N.J.), respectively. The rotational stages 330 can control the rotation angle of each printhead 303 while the goniometers 327 can control the inclination angle of each printhead 303. The final deposition location of each jet can be determined by the combined effects of the slot, goniometer, and rotational stage orientations. During printing, the linear slots can be adjusted to achieve the desired proximity between printheads 303. The goniometers 327 and rotational stages 330 can then be adjusted in conjunction to align each jet as desired.

A time-resolved imaging system (e.g., MicroFab, Plano, Tex.) was used to observe the jet orientations and ensure the collision of printed droplets during operation of the droplet generation module. By controlling the delay between the activation of a strobe and the generation of droplets, droplet positions could be observed during flight. The strobe delay and activation was controlled by the multichannel waveform generator 309, and droplets were observed using a color camera (e.g., Sentech, Carrollton, Tex.). Printing operation was commenced by achieving consistent jet intersection as observed by the time-resolved imaging system. This was achieved by adjusting the goniometer 327 and rotational stage 330 of each printhead 303. With stroboscopic alignment and feedback to control jet intersection, inconsistencies in jet trajectory are less problematic compared to sequential deposition techniques. FIGS. 4B and 4C show time-resolved imaging of the alignment of two intersecting jets and the impact of droplets in air. FIGS. 4B and 4C show the jet intersection of two droplets in air before collision and after collision, respectively. The illuminated intersecting lines illustrate the trace of jets using a long exposure time. When consistent jet intersection was achieved, the printing substrate (platform 315) was raised to the intersection height for printing. FIG. 4D shows the deposition of the intersected droplets with the substrate raised to the intersection location.

Printing Protocol

The printing process utilizing the intersecting jets printing system involves two phases: jet alignment and 3D printing. During the jet alignment phase, the droplet formation conditions for each printhead 303 are first tuned for the best jetting and droplet formation performance based on the rheological properties of each reactive material fluid. Consistent jet intersection can be achieved by adjusting the goniometer 327 and rotational stage 330 of each printhead 303. During the 3D printing phase, the deposition location of the intersecting jets is controlled along designed paths to form a layer of the combined material. As each layer is deposited, the platform 315 can lower the substrate by the vertical thickness of the printed layer. For support bath-enabled inkjet bioprinting, each printed layer on the platform is submerged into a solution, which both crosslinks and mechanically supports the structure being printed. Subsequent layers of the structure are then printed on top of the previous layers and again submerged after deposition. For printing in air, printing and crosslinking occur directly on a receiving substrate.

3D Printing Applications and Materials

The intersecting jets-based printing-then-mixing inkjet bioprinting approach, which enables voxel-resolution printing and mixing for the fabrication of biological structures using reactive materials, was implemented for evaluation and testing. Inkjetting is implemented herein as a versatile, scalable technique to generate droplets from reactive materials for mixing and deposition. Using the disclosed intersecting jets printing approach, neural stem cell (NSC) spheres were printed from a reactive NSC suspension and PuraMatrix hydrogel, acellular (alginate-only) and cellular alginate structures were 3D printed in air from reactive alginate and calcium chloride solutions, and hydroxyapatite (HAP) structures with a compositional gradient were printed from HAP nanoparticles and collagen solution. The printed NSCs remain viable through the printing process and spread within the matrix over 7 days of culture, and metabolic activity also increases during the incubation period after printing. The post-printing cell viability of cellular alginate structures remains above 90% over 3 days of culture, which is comparable to those reported elsewhere for inkjet bioprinting. The printing-then-mixing approach also enables the fabrication of a collagen sheet with a gradient of HAP content across its thickness by controlling the deposition rate of the HAP suspension.

NSC Sphere Printing and Materials

The ability to fabricate structures from reactive materials using intersecting jets was demonstrated by printing PuraMatrix spheres encapsulating NSCs. PuraMatrix is a self-assembling peptide polymer and forms a hydrogel desirable for encapsulating NSC and other cell lines at physiological pH. PuraMatrix was utilized to encapsulate NSCs within spheres. PuraMatrix is not compatible with traditional single-printhead inkjet bioprinting as it is only printable as a low viscosity acidic solution, precluding the suspension of cells and limiting its applications for bioprinting. As such, there is a need to print NSC spheres using the disclosed intersecting jets printing approach.

DM03-NSCs derived from human myotonic dystrophy type 1 induced pluripotent stem (iPS) cells (Guangbin Xia's lab, Department of Neurology, University of Florida, Gainesville, Fla.) were cultured. Briefly, NSCs were maintained in Dulbecco's Modified Eagles Medium (DMEM) (Corning Cellgro, Manassas, Va.) supplemented with 20% Fetal Bovine Serum (FBS) (HyClone, Logan, Utah) in a humidified 5% $CO_2$ incubator at 37° C., and the culture medium was replaced every 3 days as needed. To prepare NSC bioink for printing, freshly 90% confluent flasks were washed twice with phosphate-buffered saline (PBS) without calcium and magnesium (Corning Cellgro, Manassas, Va.), and incubated with 0.25% trypsin/EDTA (Gibco, Grand Island, N.Y.) for 5 min at 37° C. to detach the cells from the culture flasks. 10 mL of complete cell medium was added to the cell suspension which was centrifuged at 1,000 rpm for 5 minutes at room temperature, and the resulting pellet was resuspended in PBS to a final concentration of $5\times10^6$ cells/mL. PBS without calcium was used as the presence of calcium facilitates rapid formation of NSC aggregates which may clog the nozzle during printing. PuraMatrix precursor (Discovery Labware Inc., Bedford, Mass.) was diluted to a concentration of 0.4% (w/v) using deionized (DI) water. Finally, the $5\times10^6$ cell/mL NSC suspension was prepared as a first ink solution, and the 0.4% PuraMatrix solution was a second ink solution for fabrication.

Representative printed Puramatrix structures with encapsulated NSCs were transferred to complete medium supplemented with penicillin and streptomycin (Sigma-Aldrich, St. Louis, Mo.) for incubation. Fluorescent imaging was used to qualitatively assess cell viability and morphology by immersing structures in 100 μL PBS containing a final concentration of 10 μg/mL FDA to stain live cells green. After incubation in the dark for 5 minutes, images were captured using the EVOS FL inverted fluorescent microscope. The alamarBlue assay (ThermoFisher Scientific, Waltham, Mass.) was used to assess metabolic activity according to the manufacturer's protocol, except the incubation period was extended to 18 hours; fluorescent intensity data was collected 1, 2, and 3 days after printing using a microplate reader (Synergy HT, Biotek, Winooski, Vt.).

Referring now to FIG. 5A, shown is a schematic diagram illustrating the intersecting jet (printing-then-mixing) approach utilizing the intersecting jets printing system of FIG. 3. As shown in FIG. 5A, the first ink solution 503 comprising the NSCs suspended in PBS was deposited by one printhead 303*a* while the other printhead 303*b* simultaneously deposited the second ink solution 506 with the acidic PuraMatrix hydrogel precursor. The droplets mixed and coalesced as the PuraMatrix precursor was crosslinked due to neutralization, encapsulating the NSCs within the PuraMatrix hydrogel with minimal exposure to the acidic environment. The PBS in the printed cell solution aided in the gelation of the printed PuraMatrix hydrogel in addition to providing a cytocompatible and printable environment for the NSCs during printing. The PBS bath acted to support delicate printed structures during printing and facilitated gelation of the PuraMatrix precursor by supplying additional ions and buffering capacity to maintain a neutral pH.

Two types of NSC spheres (2 and 3 mm in diameter) were printed using deposition frequencies of 30 Hz for both jets. The designed geometry is illustrated as insert 509. The NSC spheres were printed with a constant printhead travel speed of 7.2 mm/s and a layer thickness of 25 μm. FIG. 5B is an image showing a 3 mm diameter NSC sphere as printed. FIG. 5C shows a 2 mm diameter NSC sphere after 48 hours of incubation in a 37° C., 5% $CO_2$ incubator and stained using a final concentration of 10 μg/mL FDA. The resulting green fluorescence from stained living cells is clearly visible. The printing time was approximately 3 minutes for 2 mm spheres and 9 minutes for 3 mm spheres.

Figure 6A:
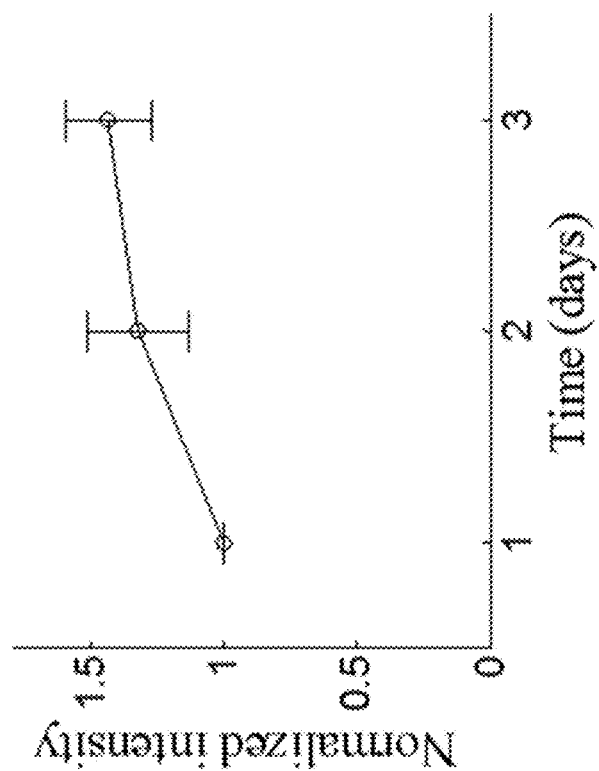
FIG. 6A includes an example of a fluorescent observation of printed cells with an inset showing the spreading after seven days of culture, in accordance with various embodiments of the present disclosure.
Figure 6B:
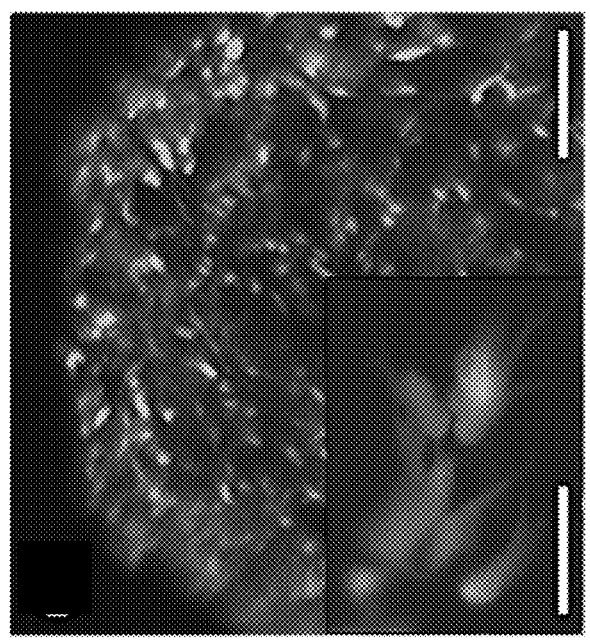
FIG. 6B is a plot illustrating the normalized fluorescent alamarBlue intensity over three days of culture of the printed cells of FIG. 6A, in accordance with various embodiments of the present disclosure.

Disks of approximately 2 mm diameter and 1 mm thickness were fabricated under identical printing conditions to act as representative structures for cell morphology and metabolic activity assessment. Compared to spheres, disks offer improved nutrient diffusion throughout and a more planar distribution of cells for imaging. Both printed spheres and disks are found to retain their shape and are robust enough for handling over 7 days of culture. Since printed PuraMatrix structures are difficult to disrupt or dissolve, cell-counting-based viability tests were not attempted. Instead, NSCs are observed by fluorescent imaging to monitor the cell morphology during an incubation period of 7 days. Referring to FIG. 6A, shown is a fluorescent observation of printed cells with an inset image showing spreading after seven days of culture. The scale bar is 250 µm for the main image and the scale bar is 25 µm for the inset. FIG. 6A illustrates that the cells were found to spread within the sphere during this period, indicating that the PuraMatrix structure provides a suitable environment for NSCs. While direct viability assays were not part of this study, the progressive changes in the cell morphology indicate that cells are alive and actively responding to their surroundings. Cell elongation and extension, as shown in the inset of FIG. 6A, are important for cell-cell contacts and junctions which enable communication and guide tissue maturation. Over the incubation period a shift toward elongated morphologies instead of the initial round morphology are observed including stellate cells and long extensions between clusters. Analogous behavior has been observed for other neural cells maintained and differentiated in PuraMatrix. Additionally, metabolic activity increases as shown in FIG. 6B and a consistent increase is observed for each printed construct, indicating the suitability of the printed PuraMatrix structures for NSC culture. FIG. 6B presents the normalized fluorescent alamarBlue intensity over three days of culture. The error bars represent one standard deviation, n=4.

Alginate Structure Printing in Air and Materials

Alginate, sodium alginate in particular, is a natural polysaccharide derived from seaweed and has been widely used as a constituent of bioink in bioprinting for its wide suitability as a versatile biomaterial. Specifically, alginate can be chemically or physically modified to have various material properties including mechanical stiffness, swelling, degradation, cell attachment, and binding or release of bioactive molecules. For most bioprinting applications, a cell-laden alginate solution is directly printed into a calcium chloride or multivalent cation solution, which functions as the crosslinking as well as supporting solution as typical for support bath-based platform-assisted printing. It has been a challenge to directly print 3D structures from a pre-mixed alginate and calcium chloride ink whose rheological properties are incompatible with bioprinting. For some applications, support bath-based printing is not realistic such as for in situ wound treatment printing where it is not practical to construct a support bath for printing locations. Fortunately, the disclosed intersecting jets printing approach can be utilized for direct 3D printing in air using separate alginate and calcium chloride solutions.

Both acellular and cell-laden alginate structures were printed in air. For acellular structure printing, sodium alginate (Acros Organics, New Jersey, USA) was dissolved in DI water to 0.5% (w/v) as an ink solution, and calcium chloride dihydrate ($CaCl_2.2H_2O$) (Sigma, St. Louis, Mo.) was dissolved in DI water to 5% (w/v) as the other ink solution. For cellular structure printing, 0.5% sodium alginate was prepared in DMEM suspending NIH 3T3 mouse fibroblasts (ATCC, Rockville, Md.) at a final concentration of $5 \times 10^6$ cells/mL. The 3T3 suspension was prepared in complete medium by following a protocol elsewhere. This resulted in a 0.5% sodium alginate and $5 \times 10^6$ cells/mL cellular ink solution while the other ink solution was the 5% (w/v) calcium chloride dihydrate solution as for acellular structure printing.

The simultaneous deposition of an acellular or fibroblast-laden alginate ink solution 703 and a calcium chloride ink solution 706 using intersecting jets 303 enables the fabrication 3D structures on a glass slide in air as shown in FIG. 7A. The printed droplets mixed and coalesced on the substrate (glass slide) so the alginate was crosslinked due to the presence of the calcium cations. Due to the deposition of the crosslinking solution, hydrogel structures could be printed directly onto a glass slide rather than within a crosslinking bath. The droplet generation frequency for alginate solutions (acellular and cell-laden alginate solution) was 60 Hz, while the calcium chloride solution was deposited at 5 Hz to minimize the volume of excess solution while ensuring complete crosslinking of the printed alginate. The structures were printed using a 1.0 mm/s printhead travel speed and a 25 µm layer thickness. Control of the distance between the printheads 303 and substrate (glass plate) during printing was needed, as the jet intersection occurred at a specified location. For this reason, the receiving glass slide was lowered by the layer thickness as each layer was deposited.

Since the ink solutions were deposited with different frequencies (60 Hz for alginate solution and 5 Hz for calcium chloride solution), the majority of the alginate droplets that were deposited did not intersect with a specific calcium droplet. However, crosslinking still occurred due to the diffusion of the calcium throughout the structures. This is a particularly interesting feature of this process. Because the droplets interact as they land on a receiving substrate, the droplet frequencies can be adjusted independently without necessarily influencing the shape fidelity of the printed constructs. In contrast, for approaches involving mid-air droplet collisions, every pair of droplets needs to be precisely coordinated to achieve the desired final trajectory with the two jets operating at the same frequency. Herein small amounts of excess fluid were wicked away from structures after printing.

FIG. 7B shows images of the printed alginate-only tube. As expected, the absence of a supporting bath limited the achievable vertical complexity of the printed gel structures due to their low mechanical stiffness. FIG. 7C are images illustrating printed cellular alginate annular structures. Phase contrast microscopy in the FIG. 7C insets clearly shows the presence of cells within the walls of the structure. FIG. 7D is a fluorescence image of a printed tube with FDA and Hoechst 33342 stains, and FIG. 7E is a fluorescence image of the cells with FDA and PI stains after liquefaction for better imaging. The fluorescence images in FIGS. 7D and 7E show many living cells and few dead cells, indicating that the fabrication process was mild and the vast majority of cells survived.

To quantitatively evaluate the printing-induced cell death, the cell viability was evaluated using trypan blue. FIG. 7F is a plot of the cell viability measured immediately after printing and over 3 days of incubation (+/−one standard deviation). The cell viabilities immediately after printing and after 1, 2, and 3 days of incubation were 85.1%, 86.2%, 87.7%, and 86.1% without considering the control and 90.7%, 93.9%, 94.7%, and 92.5% considering the control effect, respectively. Such cell viability values are comparable to those reported elsewhere for inkjet bioprinting, indicating that printing in air is not significantly more damaging than bath-based printing. The initial increase may be attributed to the post-printing proliferation, and the late decrease may be attributed to cell death in the interior of the relatively thick walls of printed tubes due to limited oxygen and nutrition diffusion.

Assessment of 3T3 Cell Viability

NIH 3T3 cell viability in printed alginate constructs was assessed qualitatively using fluorescent staining and quantitatively using trypan blue exclusion. The control was the unprinted cellular ink solution as prepared. For fluorescence imaging, intact printed constructs were immersed in 100 μL PBS containing a final concentration of 10 μg/mL Hoechst 33342 (Molecular Probes, Eugene, Oreg.) to stain nuclei blue, a final concentration of 10 μg/mL fluorescein diacetate (FDA) (Sigma-Aldrich, St. Louis, Mo.) to stain live cells green, and a final concentration of 2 μg/mL propidium iodide (PI) (Tocris Bioscience, Bristol, UK) to stain dead cells red. After incubation in the dark for 5 minutes, images were captured using an EVOS FL inverted fluorescent microscope (ThermoFisher Scientific, Waltham, Mass.). For trypan blue assays, cell-laden constructs were liquefied using sterile 1.62% sodium citrate, and an aliquot of the resulting cell suspension was mixed with trypan blue (0.4%, Sigma-Aldrich, St. Louis, Mo.), which stains dead cells blue. 10 μL of this mixture was loaded on a standard hemocytometer, and the cell viability was determined by counting live (clear) and dead (blue) cells with an EVOS XL microscope (ThermoFisher Scientific, Waltham, Mass.).

Compositional Gradient Printing Materials

Compositional gradients are ubiquitous in living organisms, providing heterogeneous microstructures/microenvironments to living cells of which they are composed. To illustrate the capability to print a structure which varies spatially in material composition, the proposed intersecting jets printing approach was implemented to fabricate a rectangular collagen sheet containing HAP nanoparticles, the concentration of which varied along the sheet thickness. Such sheets can be used as an interfacial structure between connective tissues, such as cartilage or tendon, and bone to promote functional regeneration of such interfaces.

Before fabrication, the HAP particles (nanopowder, Sigma-Aldrich, St. Louis, Mo.) were treated with a 1.62% (w/v) sodium citrate solution (Sigma-Aldrich, St. Louis, Mo.) to prevent settling and improve printability. Particles were then suspended in DI water and excess solids allowed to settle; the stable supernatant containing approximately 15 mg/mL citrate-treated HAP was then used as one of the two printing inks. An acidic collagen solution (rat tail type I, BD Biosciences, Bedford, Mass.) at a concentration of 6 mg/mL was the other ink solution. Both of the ink solutions were inkjet printed onto a platform at the surface of a PBS bath, which gelled the deposited collagen solution. The gelled collagen structure encapsulated the deposited HAP particulate suspension, which was dispensed at different frequencies in each layer to generate a compositional gradient along the thickness. After incubation for 24 hours to ensure complete gelation of the collagen component, constructs were frozen in liquid nitrogen, fractured to expose a cross-section through the thickness, freeze dried (FreeZone, Labconco, Kansas City, Mo.), and double-coated with carbon after mounting on a scanning electron microscope (SEM) specimen stub such that the cross section was available for imaging. The prepared samples were imaged and analyzed by energy dispersive spectroscopy using a desktop SEM (Phenom Pro-X, Phenom-World B.V., Eindhoven, Netherlands).

Referring next to FIG. 8A, shown is a schematic diagram illustrating the intersecting jet (printing-then-mixing) approach for fabricating a collagen sheet with a spatial variation (gradient) in HAP content along the thickness direction. The HAP ink solution 703 and collagen ink solution 706 are dispensed by the printheads 303 though jets that intersect at the deposition location within a PBS bath, crosslinking the collagen and encapsulating the printed HAP nanoparticles. A 5.00×5.00×0.75 mm square sheet was designed such that there was a three-tiered gradient in HAP content across the thickness (0.75 mm). The droplet generation frequency for collagen solution was 60 Hz, while the HAP suspension was printed at 2, 10, and 20 Hz to result in different HAP concentrations at three different layers. That is, the deposition frequency of the HAP jet during the fabrication of the lower third of the sheet was high, intermediate during the central third, and low during the upper third. This results in layers with HAP comprising 8%, 29%, and 45% of the total solids (HAP+collagen) by weight, effectively spanning the range of mineral density between soft tissues (~0%) and bone (~60%). The structures were printed using a 3.3 m/s printhead travel speed and a 50 μm layer thickness.

FIG. 8B is an image showing a top view of the printed sheet and FIG. 8C shows a schematic side view that graphically illustrates the spatial variation in the HAP content. The structure was incubated under physiological conditions for 24 hours to ensure gelation of the collagen after printing. It was then prepared for scanning electron microscope (SEM) observation such that the field of view was the cross section of the printed sheet in order to observe the HAP gradient. Energy dispersive spectroscopy (EDS) was carried out using the SEM to measure the elemental composition along a specified path drawn across the sample thickness. FIG. 8C shows a SEM image of the printed sheet with the EDS line scan location indicated on both the side view and the SEM image. Based on the chemical structure of HAP, its presence is indicated by calcium (Ca) and phosphorous (P). FIGS. 8D and 8E are plots of the EDS results for calcium and phosphorous content, respectively, and indicate the gradient of the HAP varies as desired across the thickness of the collagen structure.

An intersecting jets-based inkjet printing approach has been developed and implemented to enable voxel-resolution printing-then-mixing for the fabrication of biological structures. Two (or more) printheads can be oriented such that they deposit droplets in the same location, where printed solutions mix, interact, and coalesce. The intersecting jets-based printing-then-mixing inkjet printing approach enables the fabrication of structures using reactive materials which cannot be mixed prior to deposition. This has been demonstrated by printing PuraMatrix spheres encapsulating NSCs and directly printing alginate structures in air using sodium alginate and calcium chloride solutions. During NSC sphere printing, cells remain viable through the printing process, spread within the matrix, and exhibit increased metabolic activity over 3 days of culture. During cellular alginate structure printing, the post-printing cell viability remained above 90% over 3 days of culture, which is comparable to those reported elsewhere for inkjet bioprinting. The printing-then-mixing approach also enables the fabrication of a collagen sheet with a gradient of HAP content across its thickness by controlling the deposition rate of the HAP suspension.

The capability of the intersecting jets-based printing-then-mixing approach for the fabrication of heterogeneous structures with complex geometries may be improved. In particular, automatic feedback control of nozzle alignment can provide a robust printing implementation. Additionally, high speed imaging can be used to quantify mixing dynamics and provide insight into droplet impact, mixing, and coalescence processes as well as the effects of printing conditions. Modeling and simulation of the printing-then-mixing approach may also elucidate the fundamental impact, spread, and mixing behavior of simultaneously deposited fluids. Regarding the application of 3D culture of NSCs in the matrix, differentiation of the NSCs into mature neurons or astrocytes may improve organoid generation, which may facilitate engrafting after transplantation.

The disclosed intersecting jets-based printing-then-mixing approach can be implemented in advanced manufacturing techniques, particularly three-dimensional (3D) bioprinting, to provide potential solutions for the layer-by-layer fabrication of living tissues and organs. In the disclosed intersecting jets-based printing-then-mixing approach, printing is accomplished using individual inkjetting jets of each ingredient material. The reactive bioink components remain dispensable with suitable rheological properties to facilitate the formation of droplets or filaments as building blocks. Upon the impingement on a receiving substrate, the jets collide, mix with each other due to droplet collision and coalescence and crosslinks, resulting in a deposited feature. These deposited features collectively form a structure to be printed in a layer-by-layer fashion.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system, comprising:
a droplet generation assembly comprising a first printhead coupled to a first reservoir of a first material and a second printhead coupled to a second reservoir of a second material, the first and second printheads configured to produce jets of droplets of the first and second materials, wherein the droplet generation assembly is configured to cause the jet of droplets of the first material to be generated by the first printhead at a first droplet frequency and the jet of droplets of the second material to be generated by the second printhead at a second droplet frequency different from the first droplet frequency;
a waveform generator configured to modulate a first waveform for the first printhead to achieve the first droplet frequency and modulate a second waveform for the second printhead to achieve the second droplet frequency;
a jet alignment assembly configured to adjust orientation of the first and second printheads to align the jets of the droplets of the first and second materials for intersection at a collision point;
a motion control assembly configured to adjust positioning of the first and second printheads and a platform configured to position a deposition location at the collision point, wherein the first and second materials react or crosslink together when deposited at the collision point, wherein one or more rheological properties of a portion of a printed article are based on at least a first and second composition and a first and second relative concentration of, respectively, the first and second materials at the deposition location; and
a time-resolved imaging system comprising a camera device and an image capture controller, the time-resolved imaging system being configured to:
capture images of the intersecting jets of droplets of the first and second materials at or near the collision point,
determine, based at least upon the relative concentrations of the first and second materials at the deposition location and the one or more rheological properties of the portion of the printed article, whether a change is needed to one or more of the first droplet frequency, the second droplet frequency, alignment of the intersecting jets of droplets relative to the collision point, or a position or orientation of the platform,
in an instance in which a change is needed to one or more of the alignment of the intersecting jets of droplets relative to the collision point or the position or orientation of the platform based upon the relative concentrations of the first and second materials at the deposition location and the one or more rheological properties of the portion of the printed article, providing jet alignment feedback operable to cause one or more of the jet alignment assembly or the motion control assembly to adjust positioning of one or more of the first printhead, the second printhead, or the platform, and
in an instance in which a change is needed to one or more of the first droplet frequency or the second droplet frequency based upon the relative concentrations of the first and second materials at the deposition location and the one or more rheological properties of the portion of the printed article, provide droplet frequency feedback to the waveform generator to adjust one or more of the first waveform or the second waveform.

2. The system of claim 1, wherein the first and second printheads are mounted on an XY-stage of the motion control assembly, the XY-stage configured to adjust a horizontal position of the first and second printheads over the platform.

3. The system of claim 2, wherein a vertical position of the platform is adjusted by a Z-stage of the motion control assembly.

4. The system of claim 3, wherein the motion control assembly comprises a motion controller configured to coordinate movement of the XY-stage and the Z-stage to form a structure from the droplets of the first and second materials.

5. The system of claim 2, wherein the first printhead is mounted to the XY-stage via a rotational stage and a goniometer of the alignment assembly, the rotational stage and goniometer configured to adjust orientation of the first printhead to direct the jet of the droplets of the first material produced by the first printhead towards the collision point.

6. The system of claim 5, wherein the second printhead is mounted to the XY-stage via another rotational stage and another goniometer of the alignment assembly, the other rotational stage and other goniometer configured to adjust orientation of the second printhead to direct the jet of the droplets of the second material produced by the second printhead towards the collision point.

7. The system of claim 1, wherein the first droplet frequency is a fixed multiple of the second droplet frequency.

8. The system of claim 1, wherein the platform is a glass slide in air.

9. The system of claim 2, wherein the platform is positioned in a supporting solution bath with the deposition location at the surface of the supporting solution bath.

10. The system of claim 9, wherein the supporting solution bath comprises a crosslinking solution.

11. The system of claim 1, wherein the first and second materials are reactive materials.

12. The system of claim 11, wherein the first and second materials comprise an alginate solution and a calcium chloride solution.

13. The system of claim 11, wherein the first and second materials comprise a hydroxyapatite (HAP) suspension and a collagen solution.

14. The system of claim 2, wherein the time-resolved imaging system further comprising a stroboscopic imaging device configured to provide time-resolved imaging for alignment of the jets of the droplets of the first and second materials.

15. The system of claim 14, wherein a strobe light of the stroboscopic imaging device is synchronized with droplet production of the jets.

16. The system of claim 11, wherein the first and second materials comprise a neural stem cell (NSC) suspension and a PuraMatrix suspension.

* * * * *

UNITED STATES PATENT AND TRADEMARK OFFICE
CERTIFICATE OF CORRECTION

Page 1 of 3

PATENT NO. : 11,731,343 B2
APPLICATION NO. : 16/007081
DATED : August 22, 2023
INVENTOR(S) : Yong Huang et al.

It is certified that error appears in the above-identified patent and that said Letters Patent is hereby corrected as shown below:

On the Title Page

Delete the title page and substitute therefore with the attached title page.

In the Drawings

Please add FIGS. 4B-4D as shown on the attached page.

Signed and Sealed this
Fourteenth Day of November, 2023

Katherine Kelly Vidal
*Director of the United States Patent and Trademark Office*

(12) United States Patent (10) Patent No.: US 11,731,343 B2
Huang et al. (45) Date of Patent: Aug. 22, 2023

(54) THREE-DIMENSIONAL PRINTING OF REACTIVE MATERIALS USING INTERSECTING JETS

(71) Applicant: University of Florida Research Foundation, Inc., Gainesville, FL (US)

(72) Inventors: Yong Huang, Gainesville, FL (US); Kyle Will Christensen, Gainesville, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 1006 days.

(21) Appl. No.: 16/007,081

(22) Filed: Jun. 13, 2018

(65) Prior Publication Data
US 2018/0370116 A1 Dec. 27, 2018

Related U.S. Application Data

(60) Provisional application No. 62/525,426, filed on Jun. 27, 2017.

(51) Int. Cl.
*B29C 64/112* (2017.01)
*B29C 64/393* (2017.01)
(Continued)

(52) U.S. Cl.
CPC ......... *B29C 64/112* (2017.08); *B29C 64/209* (2017.08); *B29C 64/393* (2017.08);
(Continued)

(58) Field of Classification Search
None
See application file for complete search history.

(56) References Cited

U.S. PATENT DOCUMENTS 6,331,438 B1 * 12/2001 Aylott .............. G01N 21/66
422/82.07
2003/0175410 A1 * 9/2003 Campbell ........... A61L 27/38
427/2.24
(Continued)

OTHER PUBLICATIONS

Murphy SV and Atala A. 3D bioprinting of tissues and organs. Nature Biotechnology 32(8), 2014, 773-85.
(Continued)

*Primary Examiner* — Alejandro Valencia
(74) *Attorney, Agent, or Firm* — Alston & Bird LLP

(57) ABSTRACT

Various examples of systems and methods are provided for three-dimensional (3D) printing of reactive materials. In one aspect, among others, a system includes a droplet generation assembly comprising a first printhead coupled to a first reservoir of reactive material and a second printhead coupled to a second reservoir of reactive material, the first and second printheads configured to produce jets of reactive material droplets; a jet alignment assembly configured to adjust orientation of the first and second printheads to align the jets of the reactive material droplets for intersection at a collision point; and a motion control assembly configured to adjust positioning of the first and second printheads and a platform configured to position a deposition location at the collision point.

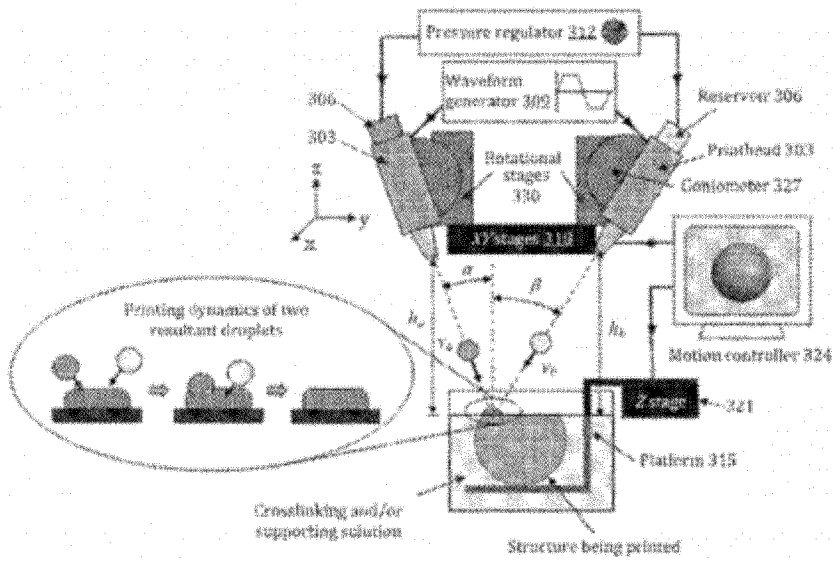

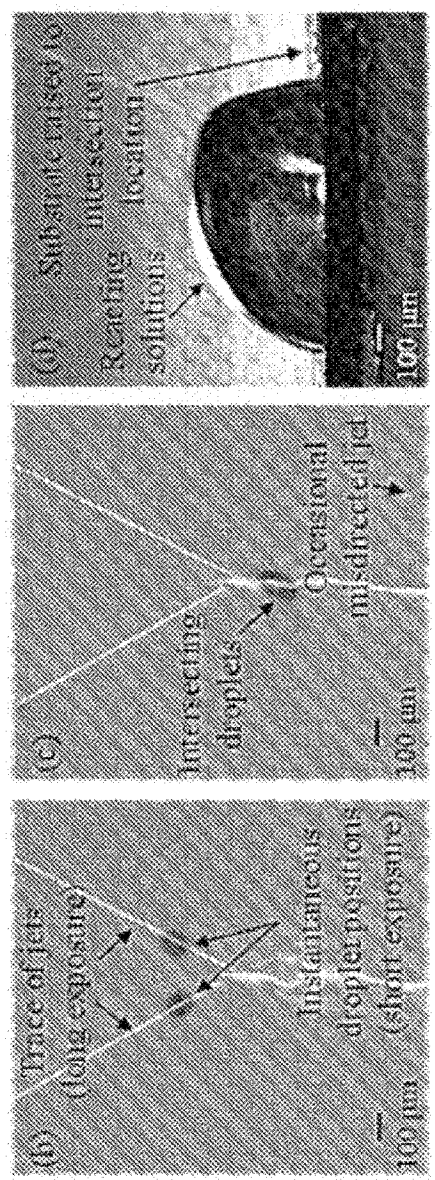

16 Claims, 9 Drawing Sheets